Feb. 1, 1944.　　　A. E. WIGELSWORTH　　　2,340,633
APPARATUS FOR DEHYDRATING VEGETABLE MATERIALS
Filed May 5, 1943　　　4 Sheets-Sheet 3

ARTHUR E. WIGELSWORTH,
INVENTOR.

BY
ATTORNEY

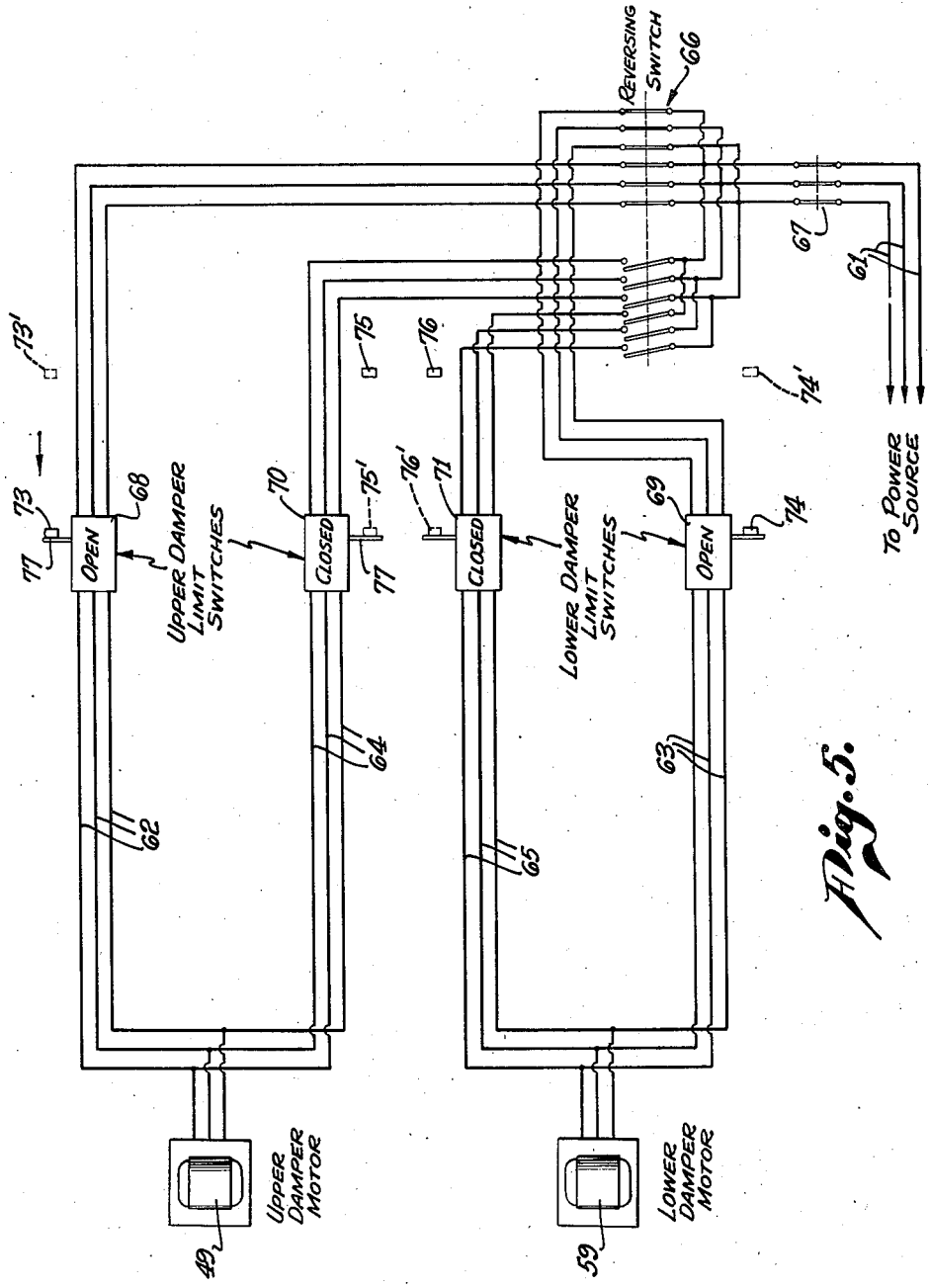

Patented Feb. 1, 1944

2,340,633

UNITED STATES PATENT OFFICE 2,340,633

APPARATUS FOR DEHYDRATING VEGETABLE MATERIALS

Arthur E. Wigelsworth, Los Angeles, Calif., assignor to Anabolic Food Products, Inc., Glendale, Calif., a corporation of Delaware Application May 5, 1943, Serial No. 485,739

8 Claims. (Cl. 34—191)

This invention relates to the dehydration of vegetable materials, such as vegetables, fruits and the like, and particularly to apparatus for dehydrating such materials by subjecting them to direct contact with a moving stream of heated air or other gaseous medium to cause evaporation of water therefrom.

The principal object of the invention is to provide a new and advantageous type of such dehydrating apparatus, in which the material is dried in a uniform and economical manner and without injury or impairment of the material by heating.

A further object is to provide an apparatus in which the above advantages are obtained and in which the desired dehydration of the material may be effected in a relatively short time, whereby a large quantity of material may be dehydrated in a given time, in an apparatus of moderate size.

Another object is to provide an apparatus that is inexpensive in construction and operation, in which the material is not moved during dehydration, and in which the flow of heated drying gas is controlled in such manner as to produce uniform and efficient dehydration without injuring the material. By avoiding movement of the material during dehydration, the mechanical handling thereof is reduced to a minimum, thus effecting a saving in cost and at the same time eliminating the possibility of physical damage to the material by excessive handling.

A particular object is to provide an apparatus in which a plurality of separate batches of material may be subjected simultaneously to dehydrating treatment, in which each batch may be independently removed when dehydration thereof is completed and a new batch introduced in its place, and in which advantageous means are provided for controlling the flow of treated gas in contact with the several batches to provide uniform and efficient dehydration thereof.

Other objects and advantages of the invention will be pointed out hereinafter or will be apparent from the following description.

The apparatus of the present invention comprises a housing provided with partitions that define a plurality of separate compartments arranged side by side and extending transversely of the housing. Doors are provided for introduction and removal of the vegetable material. The apparatus further comprises means for circulating heated air or other gas through the respective compartments longitudinally thereof. The gas introduced into each compartment is at relatively high temperature, but as the heat thereof is transferred to the material to effect dehydration thereof the gas temperature progressively decreases, so that the material adjacent the gas inlet end of each compartment is subjected to the highest temperature, the material in the intermediate portion is subjected to an intermediate temperature, and that adjacent the gas outlet end is subjected to a lower temperature, with corresponding variations in the rate of dehydration in these portions.

I therefore provide means for periodically reversing the flow of drying gas through each compartment, whereby the heated gas is alternately brought into initial contact with the material adjacent the opposite ends of each compartment. By properly controlling the frequency of reversal of gas flow with relation to the total time required for dehydration, I am thus able to dehydrate uniformly all portions of the material without excessive heating or dehydration of any portion thereof. Furthermore, since the dehydration thus progresses substantially uniformly as the gas flow is repeatedly reversed, the dehydration of all portions is completed in the least possible time and with a minimum heat requirement.

The accompanying drawings illustrate a preferred form of apparatus according to this invention, in which heated air is used as the drying medium. Although air is generally suitable for the purpose, it will of course be understood that any other desired gas may be introduced into the system, either in place of or along with the air which, in the embodiment illustrated, is continually drawn into the system from the surrounding atmosphere.

Referring now to the accompanying drawings:

Fig. 5 is a wiring diagram illustrating a circuit arrangement that may be used for controlling the damper-operating motors.

Figure 1:
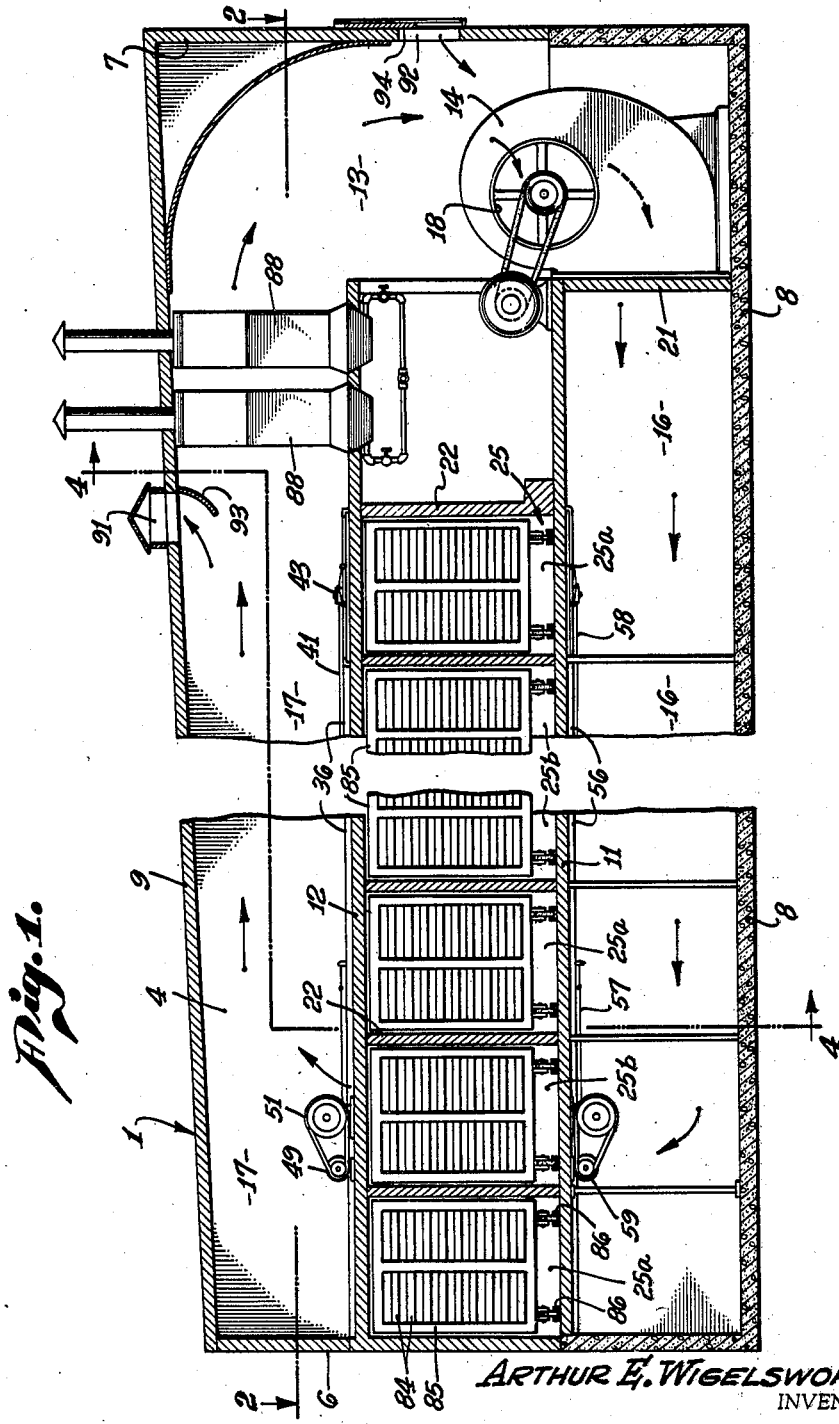
Fig. 1 is a partial longitudinal vertical section of the apparatus, taken on line 1—1 in Fig. 2.

The apparatus is shown as comprising an elongated housing 1 preferably disposed partially below the ground or floor level indicated at 2, and including side walls 3 and 4, end walls 6 and 7, bottom wall 8 and top wall 9. Vertically spaced intermediate walls or partitions 11 and 12 extend substantially horizontally from the end wall 6 at one end of the housing through the major portion of the length of the housing, the other ends of said walls being spaced somewhat from the other end wall 7 to provide a gas passage space 13 at that end of the housing, in which is located a fan 14 for maintaining circulation of air.

The intermediate walls 11 and 12 extend across the entire width of housing 1 and are spaced from the bottom wall 8 and top wall 12, thus providing a supply duct 16 for heated air below wall 11 and a return duct 17 above wall 12. The duct 17 communicates with the upper end of passage 13. The inlet of fan 14 opens directly into said passage 13, preferably at both ends of the fan housing as indicated at 18, while the outlet of said fan communicates with supply duct 16 through an opening 19 in a wall 21 that shuts off duct 16 from direct communication with passage 13.

Figure 3:
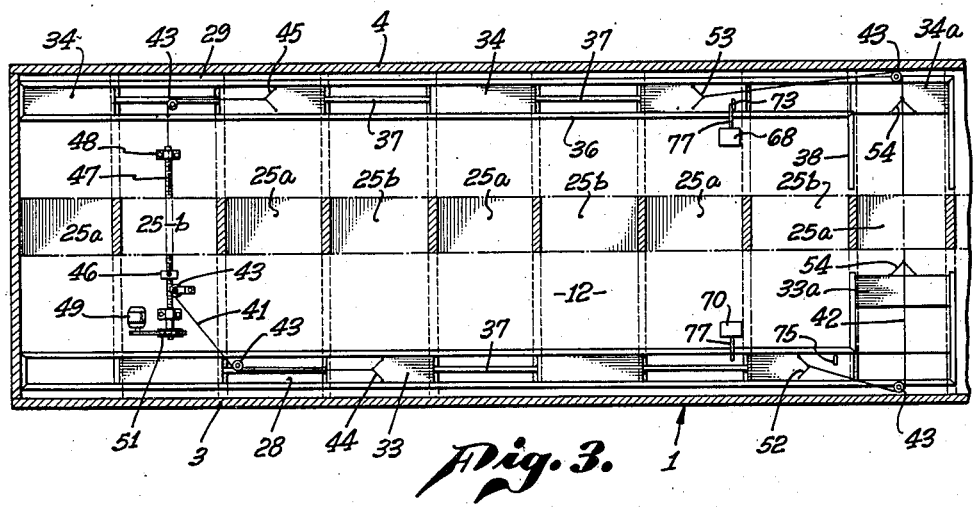
Fig. 3 is a somewhat diagrammatic plan view of the complete outlet damper system and the operating mechanism therefor, taken substantially on the same plane as Fig. 2 but with the top wall of the dehydrating compartments partly broken away.

A plurality of equally spaced vertical walls or partitions 22 extend across the entire width of the housing and between the intermediate walls 11 and 12 and serve to define a plurality of separate dehydrating compartments 25 extending transversely of the housing, alternate ones of said compartments being designated by the reference numerals 25a and 25b respectively, as shown best in Fig. 3. The several compartments are thus arranged side by side in a row and the supply and return ducts extend along the row at opposite sides thereof, the supply duct 16 being shown as extending along the lower side and the return duct 17 along the upper side.

The walls 11 and 12 separate the compartments 25a and 25b from the ducts 16 and 17, but are provided with openings for establishing communication between said compartments and said ducts adjacent each end of each compartment, that is, at positions adjacent the opposite side walls 3 and 4 of the housing. Thus, wall 11 is provided with inlet openings 26 and 27 located adjacent the respective ends of each of the compartments 25a and 25b, for establishing communication from supply duct 16 to each of said compartments, and wall 12 is provided with outlet openings 28 and 29 located adjacent the respective ends of each compartment, for establishing communication therefrom to the return duct 17.

I also provide suitable damper means including damper members movable to closed and open positions with respect to the inlet openings 26 and 27 and the outlet openings 28 and 29 of the several compartments, and means for operating the damper members between these positions. The arrangement of the dampers and operating means is preferably such that, upon movement of the damper members to one position, open communication is established between certain ones of the drying compartments 25 and the supply duct 16 at one end of such compartments, and between those compartments and the return duct 17 at the other end thereof while the damper members close communication between those compartments and the supply and return ducts at said other end and said one end respectively, and the opposite relation of the dampers is established for the remaining compartments. Periodically, the positions of the dampers are reversed. Thus, with the dampers in one position, the heated air from supply duct 16 passes through some of the compartments 25 in one direction and through the remaining compartments in the opposite direction, and with the dampers in the other position the direction of flow of the heated drying air is reversed in all compartments.

Referring now to the drawings, I have shown two series or trains of inlet dampers, 31 and 32, movable to open and closed positions with respect to the inlet openings 26 and 27 respectively, and two series or trains of outlet dampers, 33 and 34, movable to open and closed positions with respect to the outlet openings 28 and 29 respectively. In the preferred arrangement shown the dampers are so arranged as to respectively close and open corresponding openings at each end of the alternately disposed compartments 25a and 25b respectively.

Figure 2:
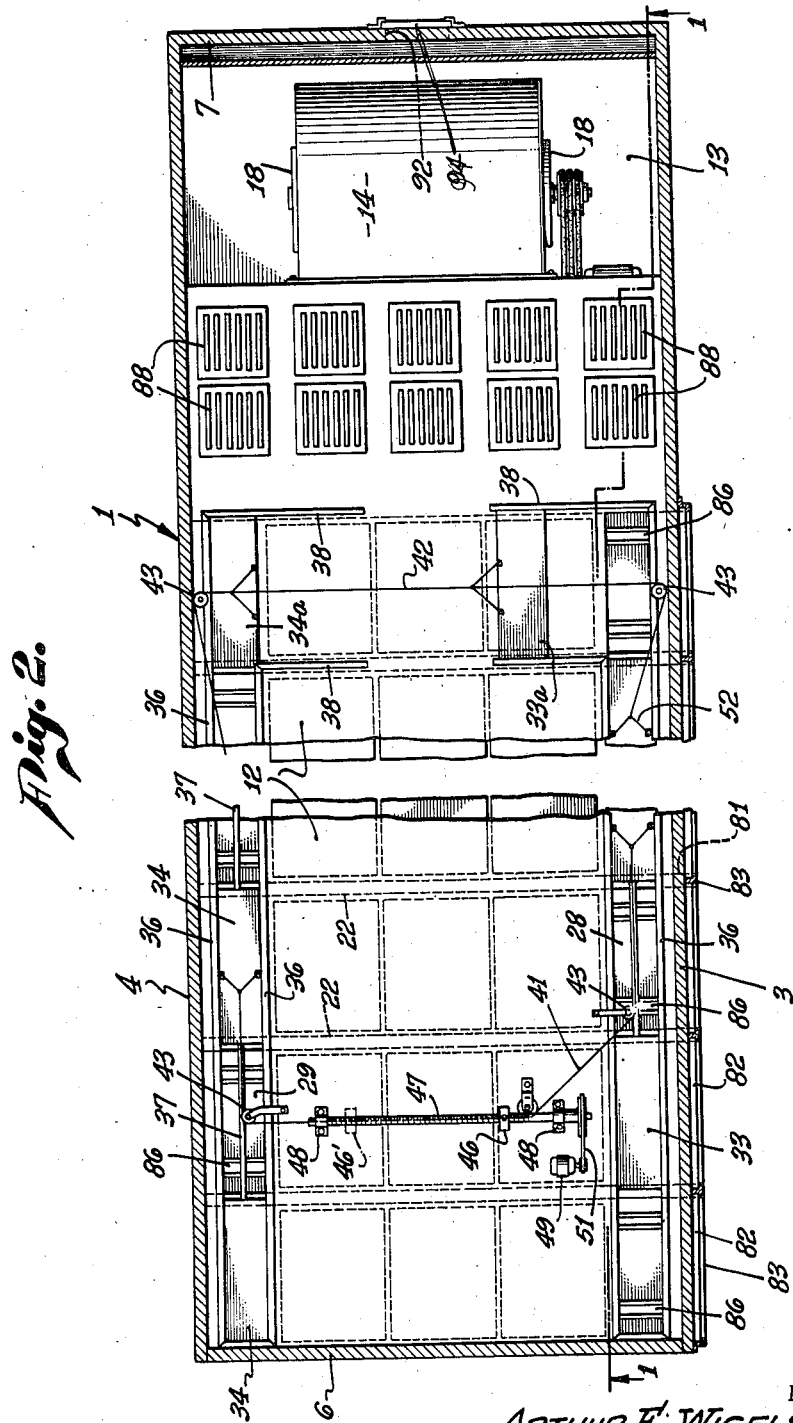
Fig. 2 is a horizontal section on line 2—2 in Fig. 1.

The arrangement of the outlet dampers 33 and 34, and the operating means therefor, are clearly shown in Figs. 2 nd 3. Each of these dampers is of sufficient length and width to completely cover one of the outlet openings 28 and 29 respectively, and the several damper members of each train are spaced apart longitudinally, the spacing therebetween being substantially equal to or greater than the length of the respective openings. The dampers are shown as mounted for longitudinal sliding movement in guide channels 36 and are operatively connected and maintained in properly spaced relation by means of bars 37 secured at their respective ends to each pair of adjacent damper members.

In the particular apparatus shown, there are an odd number of drying compartments, and in order to conserve space, the damper members for the drying compartment at one end of the row are moved transversely between open and closed positions with respect to the openings of that compartment. Thus, the damper members 33a and 34a shown in Figs. 2 and 3 are slidably mounted in transversely extending guide channels 38.

With the dampers in the positions shown, dampers 33 close the outlet openings 28 at one end of the alternate compartments 25b while dampers 34 and 34a close the outlet openings 29 at the opposite end of the compartments 25a, the openings 28 at said one end of compartments 25a and openings 29 at said opposite end of compartments 25b being open.

The dampers may be operated by means of elongated flexible traction means such as wire ropes 41 and 42 guided by suitably disposed pulleys 43. Traction member 41 is secured at one end to one of the dampers 33, as at 44, and at the other end to one of the dampers 34 as at 45. Said member 41 is also secured to a threaded rider 46 operated by screw 47 rotatably mounted in bearings 48. Said screw is operated by a reversible electric motor 49 through suitable drive means 51. The other traction member 42 is also secured at its ends to one of the dampers 33 and to one of the dampers 34, as at 52 and 53 respectively, and is secured intermediate its ends to the dampers 33a and 34a, as at 54.

Upon operation of motor 49 in the proper direction, screw 47 will cause movement of rider 46 to the position shown in dotted lines at 46' in Fig. 2. Traction member 41 will thereupon move dampers 33 to the left in Fig. 2, which will in turn operate through traction member 42 to move damper 33a to closed position and damper 34a to open position, and to move dampers 34 to the right. Thus, the position of all the outlet dampers 33, 33a, 34, 34a are reversed with relation to the outlet openings of the respective compartments 25a and 25b.

The inlet dampers 31 and 32 are similarly mounted for sliding movement in guide channels 56 and are provided with operating means similar to those above described for the outlet dampers, including traction members 57 and 58 and motor 59. However, the positions of the inlet dampers are the reverse of those for the outlet dampers, as will be apparent from the relative positions of dampers 31, 32, 33, 34 in Fig. 4.

Figure 4:
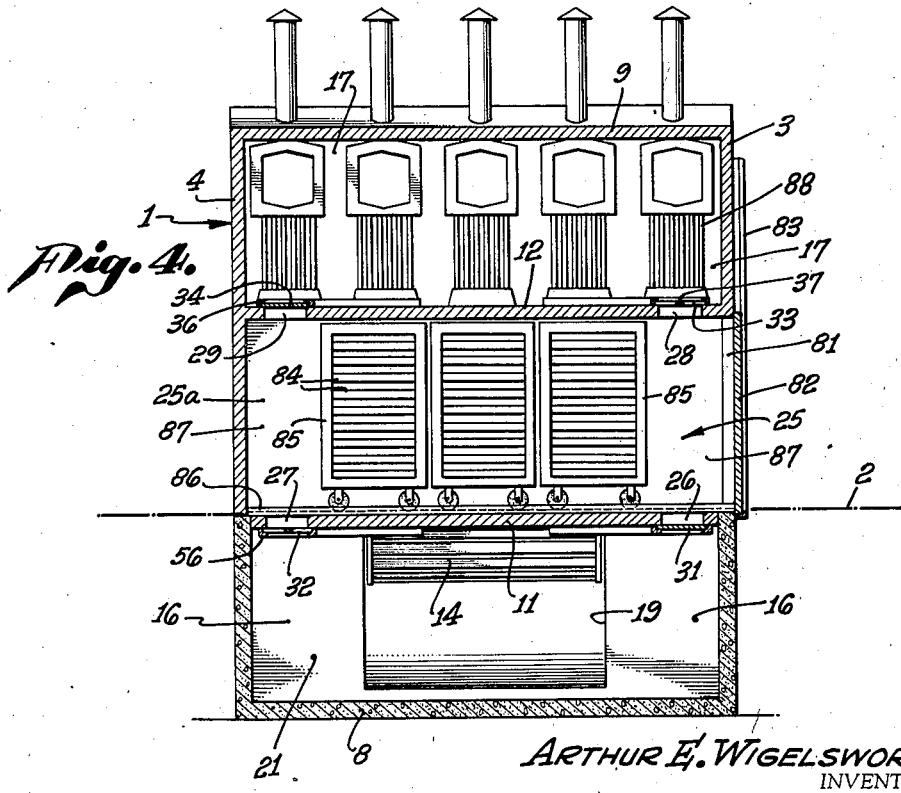
Fig. 4 is a transverse vertical section, taken on line 4—4 in Fig. 1.

It will now be apparent that, with the dampers in the positions shown, air from supply duct 16 will enter the compartments 25a through openings 27, will flow through said compartments from left to right in Fig. 4, and will pass therefrom through openings 28 into the return duct 17. At the same time, air from said supply duct will enter the remaining compartments 25b through openings 26, will flow therethrough from right to left, and will pass therefrom through openings 29 into the return duct. Upon reversing the positions of the dampers by operation of motors 49 and 59 as described above, the direction of flow through all the compartments will be reversed.

A suitable control circuit for the damper operating motors 49 and 59 is shown in Fig. 5. The motors are shown as three-phase induction motors adapted to be connected to three-phase power supply lines 61, either through leads 62 and 63 respectively to cause rotation of each motor in one direction, or through leads 64 and 65 respectively to cause rotation of each motor in the opposite direction. Reversing switch 66 may be operated manually to connect either pair of leads to the supply line 61, and a main power supply switch 67 may also be provided. Limit switches 68, 69, 70 and 71 are preferably provided, for opening and closing the circuits through the leads 62, 63, 64 and 65 respectively. These limit switches are biased toward closed position and are moved to open position by means of suitably positioned lugs or other actuating members 73, 74, 75 and 76 secured to one of the damper members of each train, which engage arms 77 of the corresponding switch. The positions of these limit switches and actuating members for the outlet damper system are shown in Fig. 3, and those for the inlet damper system are comparably positioned.

With the outlet dampers in the positions shown in Fig. 3 and the inlet dampers in the reverse position as noted above, the limit switches 68 and 69 are held open by engagement of actuating members 73 and 74 with the corresponding switch arms 77. Thus, the motor circuits 62 and 63 are open at these limit switches, while motor circuits 64 and 65 are open at the reversing switch 66. By operating reversing switch 66 to open circuits 62 and 63 and close circuits 64 and 65, motors 49 and 59 are operated in the proper directions to reverse the positions of both the inlet and outlet dampers. Limit switches 68 and 69 are thereupon closed. When the dampers reach the end of their desired travel to the reverse positions, limit switches 70 and 71 are opened to stop the motors, the positions of the actuating members at this time being indicated in dotted lines at 73', 74', 75' and 76' in Fig. 5.

Openings 81 are provided in one of the side walls of housing, as in side wall 3, at one end of the respective dehydrating compartments 25. These openings are normally closed by doors 82 that are arranged to slide vertically in guide members 83, whereby the doors may be raised vertically to open position to provide for introduction into the respective compartments of material to be dehydrated, and for removal of the dehydrated material therefrom. The material is ordinarily distributed on suitable pervious trays 84 arranged in vertically spaced relation on wheeled trucks 85, and a pair of panels or rails 86 is provided in each compartment for receiving and guiding said trucks. In Fig. 4 I have shown three such trucks disposed within one of the dehydrating compartments 25a, these trucks being positioned centrally of the length of the compartment and between the positions of the respective inlet and outlet openings, so as to provide a free and unobstructed vertical gas passage space 87 at ach end of the compartment, facilitating distribution of gas flow over the entire height of the compartment.

Suitable means are provided for heating the circulated air. For this purpose, I have shown a plurality of heat exchange devices 88 located in the return duct 17. These heating devices may be of any suitable type but are shown as comprising gas fired heaters constructed and arranged to heat the circulated air indirectly by transfer of heat from the hot combustion gases to the air.

A portion of the air leaving the dehydrating compartments is continually discharged from the return duct through outlet opening 91 in the top wall of the housing, while fresh air is continually drawn into the system through an inlet opening 92 in end wall 7, said inlet opening 92 communicating with the gas passage space 13. A deflector plate or baffle 93 is preferably provided adjacent the outlet opening 91, extending downwardly from the top wall 9 at the down stream side of said opening, and a damper 94 is preferably provided for regulating the quantity of fresh air drawn in through opening 92, to maintain the desired wet bulb temperature in the system. In the operation of the apparatus, trucks 85 loaded with material to be dehydrated are introduced into one or more of the dehydrating compartments, and fan 14 and heaters 88 are operated to provide continuous circulation of heated air through the dehydrating compartments.

In the compartment 25a shown in Fig. 4, the heated air enters the left end of the compartment through inlet opening 27, flows through compartment as described above and leaves through outlet opening 28. It will be apparent from the above description, that at the same time, the flow of air through the next adjacent compartment is in the reserve direction. Thus, in each of the compartments 25a the highest temperature air will contact the material adjacent the left end of the compartment, while in each of the compartments 25b the highest temperature air will contact the material adjacent the right end of the compartment. This will cause the material thus initially contacted by the heated air to be heated to a somewhat higher temperature, and consequently to be dried more rapidly, than the material adjacent the opposite ends of the respective compartments. After a suitable interval of time, the positions of the dampers are reversed, resulting in a reversal of the direction of airflow in the respective compartments, which will serve to equalize the heating and drying effect and produce substantially uniform drying of all portions of the material.

The apparatus is particularly useful in the drying of vegetables, such as carrots or green leafy vegetables. A very efficient utilization of heat is obtained, without injury or impairment of the material due to overheating or unduly prolonged heating, or excessive dehydration, of any portions of the materials.

For the dehydration of such vegetables, the temperature of the air or other gaseous medium supplied to the drying chambers is in most cases preferably maintained below 175° F. In the drying of carrots, for example, the following temperatures may be obtained:

Dry bulb temperature of air entering
  dehydrating compartments _____ 160° F;
Dry bulb temperature of air leaving
  dehydrating compartments_____ 140° F;
Wet bulb temperature of air leaving
  dehydrating compartments _____ 105° F.

Under these conditions, with the dampers in the position shown in Fig. 4, the temperature of the air coming in contact with the material would be approximately 160° F. at the left side of the compartment, 150° F. at the middle of the compartment, and 140° F. at the right side. When the dampers are reversed, the corresponding temperatures would be about 140° F, 150° F. and 160° F., so that the average temperature to which the material is subjected during a series of successive cycles with the dampers in the two different positions is substantially uniform throughout the entire batch of material in each compartment.

I claim:

1. An apparatus for dehydrating vegetable materials comprising: housing means defining a plurality of separate dehydrating compartments arranged in a row and each adapted to receive material to be dehydrated; a gas circulating and heating system including supply and return ducts extending along said row of compartments at opposite sides thereof; means for establishing flow of gas, from said supply duct to said return duct, longitudinally in one direction through one set of said compartments and longitudinally in the oposite direction through the remaining compartments; and means for periodically reversing the direction of flow of gas through all of said compartments.

2. An apparatus for dehydrating vegetable materials comprising: housing means defining a plurality of separate dehydrating compartments arranged in a row and each adapted to receive material to be dehydrated; a gas circulating and heating system including supply and return ducts extending along said row of compartments at opposite sides thereof; means for establishing flow of gas, from said supply duct to said return duct, longitudinaly in one direction through alternate ones of said compartments and longitudinally in the opposite direction through the remaining compartments; and means for periodically reversing the direction of flow of gas through all of said compartments.

3. An appartus for dehydrating vegetable materials comprising: a housing provided with wall means including a plurality of spaced transversely extending partitions and defining a plurality of separate compartments arranged in a row and each adapted to receive material to be dehydrated, said housing being provided with doors for introduction of material to, and removal of material from, each of said compartments; a gas circulating and heating system comprising means defining a supply duct extending along said row of compartments at one side whereof and a return duct extending along said row of compartments at the opposite side thereof, a fan arranged to receive gas from said return duct and to deliver gas to said supply duct, and means for heating such gas during its passage from the return duct to the supply duct; said wall means being provided with inlet openings for establishing communication from said supply duct to each of said compartments adjacent each end thereof, and with outlet openings for establishing communication from each of said compartments, adjacent each end thereof, to said return duct; and damper means movable to closed and open positions with respect to said openings.

4. An apparatus for dehydrating vegetable material as set forth in claim 3, said damper means comprising a plurality of damper members movable to one position to close one set of said openings between said supply duct and certain of said compartments at one end thereof, between the supply duct and the remaining compartments at the other end thereof, between said certain compartments and the return duct at said other end thereof, and between said remaining compartments and the return duct at said one end thereof, and to open communication through the remaining openings; and to another position to open communication through said one set of openings and close said remaining openings.

5. An apparatus for dehydrating vegetable materials as set forth in claim 3, said damper means comprising a plurality of damper members movable to one position to close a set of openings between said supply duct and alternate ones of said compartments at one end thereof, between the supply duct and the remaining compartments at the other end theerof, between said alternate compartments and the return duct at said other end thereof, and between said remaining compartments and the return duct at said one end theerof, and to open communication through the remaining openings between said compartments and said supply and return ducts; and to another position to open communication through said set of openings and close said remaining openings.

6. An appartus for dehydrating vegetable materials as set forth in claim 3, said damper means comprising a plurality of inlet dampers each movable between one position to close the opening between one of said ducts and one of said compartments adjacent one end of that compartment and to open communication through the opening between said one duct and an adjacent compartment adjacent said one end thereof, and another position to open communication through said opening between said one duct and said one compartment adjacent said one end and close said opening between said one duct and said adjacent compartment; and said appartus also comprising means operatively connected to all of said dampers to move each damper between said two positions.

7. An apparatus for dehydrating vegetable materials as set forth in claim 3, said damper means comprising a plurality of inlet dampers movable to a first position to open one set of said inlet openings at one end of certain ones of said compartments and at the opposite end of the other compartments and to close the remaining inlet openings, and to a second position to close said one set of inlet openings and open said remaining inlet openings, and a plurality of outlet dampers movable to a first position to open one set of outlet openings at the opposite end of said certain compartments and at said one end of said other compartments and to close the remaining outlet openings, and to a second position to close said one set of outlet openings and open said remaining outlet openings; and said apparatus also comprising means operatively connected to all of said dampers to move them simultaneously between said first and second positions.

8. An appartus for dehydrating vegetable materials as set forth in claim 3, said damper means comprising a plurality of inlet dampers movable to a first position to open one set of said inlet openings at one end of alternate ones of said compartments and at the opposite end of the other compartments and to close the remaining inlet openings and to a second position to close said one set of inlet openings and open said remaining inlet openings, and a plurality of outlet dampers movable to a first position to open one set of outlet openings at the opposite end of said alternate compartments and at said one end of said other compartments and to close the remaining outlet openings, and to a second position to close said one set of outlet openings and open said remaining outlet openings; and said apparatus also comprising means operatively connected to all of said dampers to move them simultaneously between said first and second positions.

ARTHUR E. WIGELSWORTH.